(12) United States Patent
Kantola et al.

(10) Patent No.: US 6,230,020 B1
(45) Date of Patent: May 8, 2001

(54) METHOD AND DEVICES FOR TRANSMITTING SHORT MESSAGES

(75) Inventors: Janne Kantola, Lempäälä; Minna Koivula, Tampere, both of (FI)

(73) Assignee: Nokia Mobile Phones Ltd., Espoo (FI)

(*) Notice: Subject to any disclaimer, the term of this patent is extended or adjusted under 35 U.S.C. 154(b) by 0 days.

(21) Appl. No.: 09/456,593

(22) Filed: Dec. 8, 1999

(30) Foreign Application Priority Data

Dec. 11, 1998 (FI) .......................................... 982695

(51) Int. Cl.[7] ........................................ H04Q 7/20
(52) U.S. Cl. .................... 455/466; 455/422; 455/412; 455/550
(58) Field of Search ................... 455/466, 461, 455/412, 564, 422; 340/825.44, 825.02, 565, 550

(56) References Cited

U.S. PATENT DOCUMENTS

| | | | |
|---|---|---|---|
| 5,806,000 | * 9/1998 | Vo et al. | 455/466 |
| 5,878,397 | * 3/1999 | Stille et al. | 704/466 |
| 5,946,630 | * 8/1999 | Willars et al. | 455/466 |
| 5,966,663 | * 10/1999 | Gleason | 455/466 |
| 6,052,597 | * 4/2000 | Ekstrom | 455/456 |
| 6,058,303 | * 5/2000 | Astrom et al. | 455/413 |
| 6,085,099 | * 7/2000 | Ritter et al. | 455/466 |

* cited by examiner

Primary Examiner—William G. Trost
Assistant Examiner—Marceau Milord
(74) Attorney, Agent, or Firm—Perman & Green, LLP (57) ABSTRACT

A method and a mobile station by which a call can be initiated during the transmission of a set of short messages for making the initiation of the call more surely successful, because all mobile networks do not support the initiation of a call in the middle of the transmission of short messages but, instead, most of them support the transmission of short messages in the middle of an ongoing call. The mobile station temporarily ends the transmission (430) of short messages and waits until the end (450) of the transmission of a first short message before it begins the initiation (460) of a call with a mobile network. After beginning the creation of the call with the mobile network, the mobile station will begin the transmission (470) of the short messages that remained unsent, to the mobile network.

18 Claims, 5 Drawing Sheets

METHOD AND DEVICES FOR TRANSMITTING SHORT MESSAGES

FIELD OF THE INVENTION

The present invention relates to mobile phones and in particular to transmitting a short message by them.

BACKGROUND OF THE INVENTION

So-called Point to Point short messages have been used in the GSM (Global System for Mobile communications). Point to Point short messages are short, max. 160 characters long short messages transmitted and received by a GSM mobile phone. Short messages have also been called text messages according to their most common use. These short messages can also be concatenated for transferring a message more than 160 characters long. Concatenated text messages can be used, in particular, in advanced mobile stations, such as Nokia 9000 Communicator, which have a large display in relation to the mobile station's size, and a QWERTY keyboard.

Initiating a call during the transmission of a short message does not always succeed although the transmission of a short message during a call does. The reason for this may be for example that a GSM network ignores the call request or rejects the request and informs the mobile station, requesting a call, of this. In this case, in order to implement the call, a user must wait until the ongoing transfer of a short message from the GSM phone to be used for making the call, ends. It does not take long to wait for the ending of the transfer of one short message, only a few seconds, but if there are a larger number of short messages to be transferred for transferring the above-mentioned longer messages, the user may have to wait for several minutes before the short messages have been transmitted, and he can again make a call with his phone. In the GSM controlled interruption of the transmission of a short message being transmitted is not allowed.

SUMMARY OF THE INVENTION

To solve the above-mentioned problem or at least to mitigate it, a mobile station has been invented, which schedules the initiation of a call in between short messages to be transmitted. Thus, the call can also be initiated in the middle of the transmission of short messages in most such GSM networks, where the network does not support the initiation of a call during the transmission of a short message. A mobile station first transmits an uncompleted short message in full, closes the connection reserved for the transmission of the short message, and initiates a call. After this, it begins to transmit the short messages that remained untransferred.

It is characteristic of a method according to the invention for initiating a wireless call by a mobile station also capable of transmitting short messages that when a user gives a call initiation command, it will be checked whether the transmission of a short message is going on, and when this is the case, the method comprises:

holding the initiation of the call and the transmission of new short messages;

after the transmission of said short message has ended, holding the initiation of the call until the data transfer channel used for the transfer of the short message has been released, after which it will be continued to initiate the call by sending a mobile network a call initiation command; and ending said holding of the initiation of the transmission of short messages.

It is characteristic of a mobile station, according to the invention, comprising a radio transmitter-receiver and an antenna for transmitting a short message via a mobile network to a second terminal;

calling means for giving a call initiation command, that the mobile station comprises holding means for holding the initiation of the transmission of short messages in response to the giving of said initiation signal;

indication means for indicating the ongoing transmission of a short message and for indicating the ending of such transmission of a short message;

a radio transmitter-receiver for transmitting a call initiation command in response to an indication of the ending of the transmission of a short message following the initiation signal of said call; and in response to the transmission of said call initiation command, said holding means are arranged to end said holding.

BRIEF DESCRIPTION OF THE DRAWINGS

In the following, the invention will be explained in more detail by referring to the enclosed drawings, in which.

DETAILED DESCRIPTION

Figure 1A:
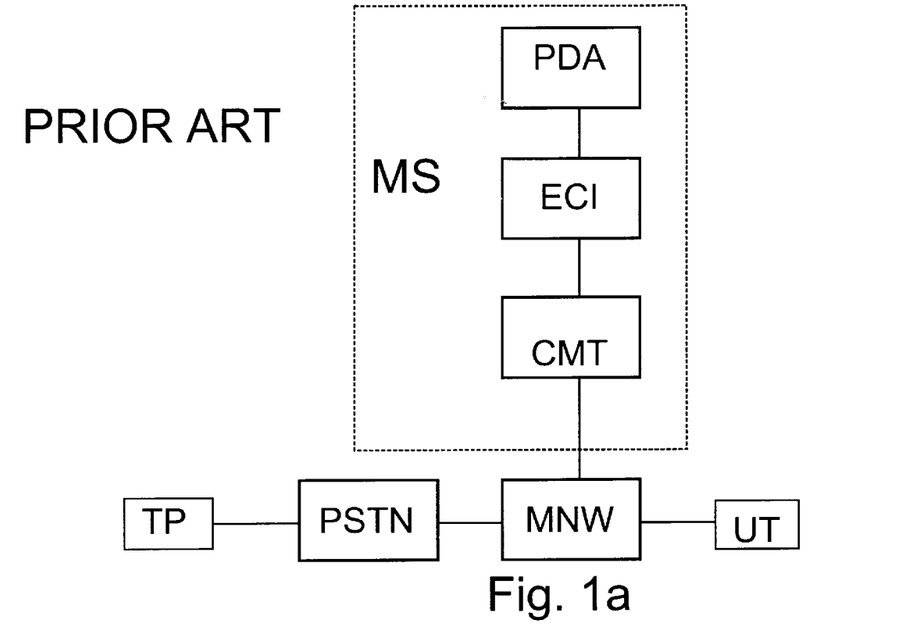
FIG. 1a shows in block diagram form a multiservice mobile station, according to prior art, connected to a public switched telephone network.

The block diagram 1a shows a multiservice Mobile Station MS according to prior art connected to a Mobile NetWork MNW, e.g. to a GSM network and through it to a Public Switched Telephone Network (PSTN). The MS comprises a PDA part (Personal Digital Assistant), a mobile phone part CMT (Cellular Mobile Telephone) and an electronic access interface ECI (External Control Interface) between them. The CMT comprises means for connecting to the MNW, for creating calls and for transmitting and receiving short messages. The PDA part comprises means for carrying out various kinds of applications, such as a notebook and a calendar, benefiting the user. The PDA can also send via the CMT messages as short messages using the electronic access interface ECI built between them. The mobile network is connected to the public switched telephone network PSTN. A large number of telephones TP and user terminals UT, which user terminals can be e.g. devices according to the invention or mobile stations according to prior art (e.g. Nokia 2110 mobile phone) capable of receiving a short message, can connect to the mobile network and the public switched telephone network.

Figure 1B:
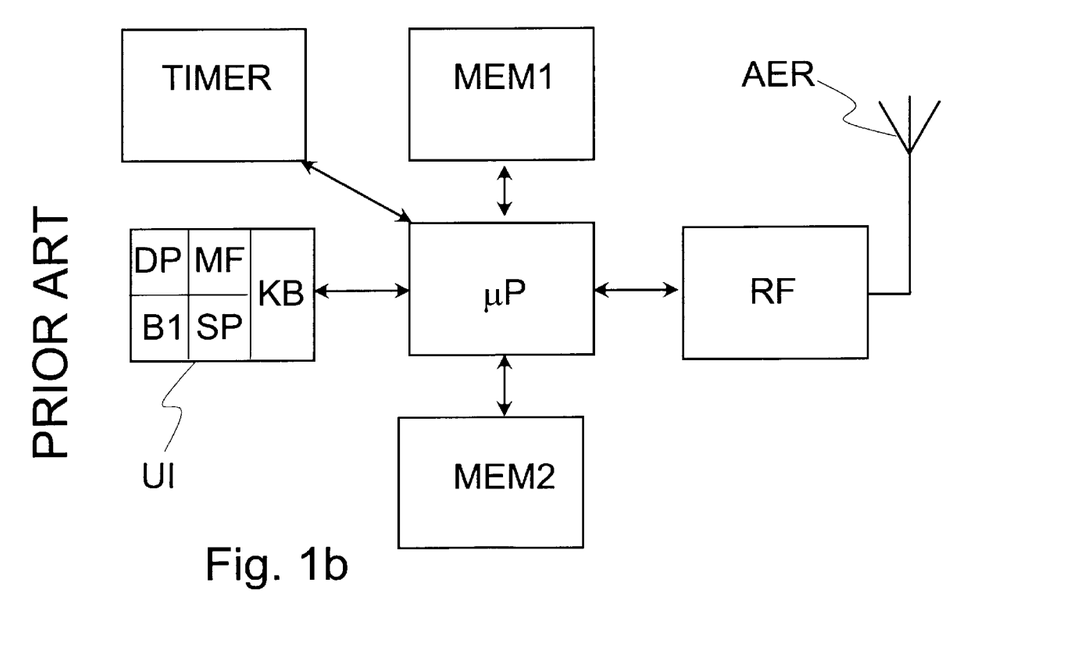
FIG. 1b shows in block diagram form a telephone part of a multiservice mobile station according to prior art.

FIG. 1b is a block diagram of means comprised by a multiservice mobile station, according to the invention, for presenting menus, reading input and controlling the mobile station. A microprocessor μP, comprised by the mobile station, controls blocks responsible for the mobile station's different functions: a RAM memory (Random Access Memory) MEM1, a radio part RF (Radio Frequency), a ROM memory (Read Only Memory) MEM2, and a User Interface UI. The user interface comprises a call switch B1, a keyboard KB, display devices DP comprising at least one display, a speaker SP, and a microphone MF. The microprocessor's operating instructions i.e. program and the mobile station's basic menus have been stored in the mobile station in advance e.g. in connection with the manufacturing process in the ROM memory MEM2. In accordance with its program, the microprocessor uses the RF block for transmitting and receiving messages on a radio path. The microprocessor monitors the status of the call switch B1, included in the user interface, and when it is being used, attempts to initiate a call to a destination using the radio part and an antenna AER. The mobile station's data transfer features can be used for fetching new information into the mobile station's RAM memory MEM1. The mobile station may also comprise a TIMER for its alternative implementation form as will be explained later.

Figure 2:
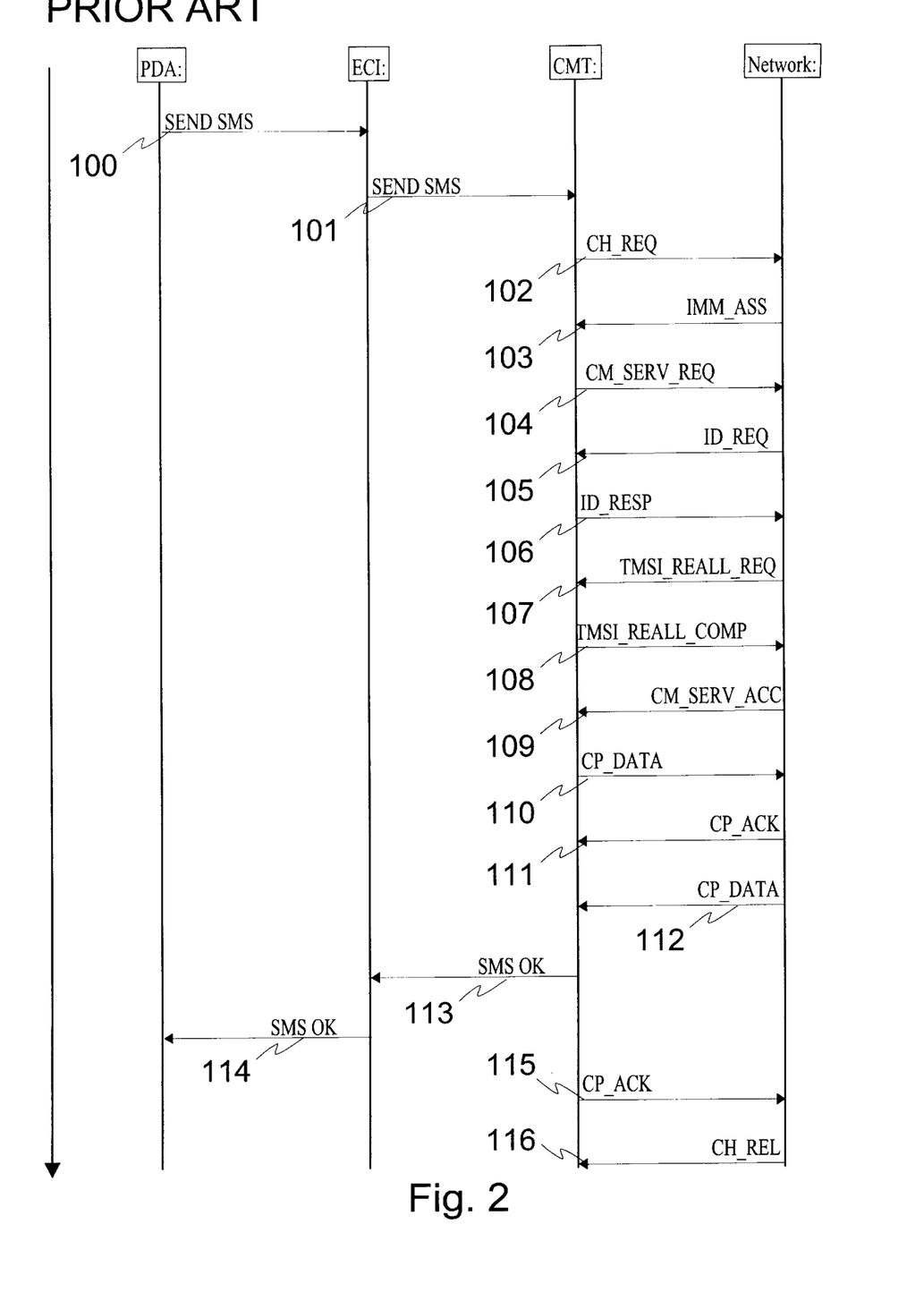
FIG. 2 shows in flow diagram form signalling between a GSM phone of prior art, and a network on a radio interface when a short message is being transmitted by the phone connected to the network.

The flow diagram 2 shows signalling between the parts PDA, ECI and CMT of a GSM mobile station and the mobile network MNW when a short message is being transmitted by the mobile station connected to the network. In step 100, the PDA transmits a first short message of a three-short message long message to the ECI which, in step 101, forwards the message to the CMT. In step 102, the CMT transmits a request "CH_REQ" for a channel to the MNW which, in step 103, replies to the request with a message "IMM_ASS" and assigns a channel for the CMT. In step 104, the CMT requests a connection for transmitting a short message with a message "CM_SERV_REQ" after which, in some mobile networks, the MNW and the CMT communicate with one another with messages 105 "ID_REQ", 106 "ID_RESP", 107 "MSI_REALL_REQ2 and 108 "TMSI_REALL_COMP". In step 109, the MNW accepts the connection for the short message with a message "CM_SERV_ACC" and, in step 110, "CP_DATA", the transfer of the short message from the CMT to the MNW begins. A little later, the data of the short message have been transferred and the MNW informs the CMT of the transfer first with a message 111 "CP_ACK" and then of the successful transfer of the short message with a message 112 "CP_DATA". The CMT sends the ECI a message 113 "SMS OK" of the success of the first message and the ECI sends further a message 114 "SMS OK" of this to the PDA. After this, the CMT sends the MNW a message 115 to which the MNW replies in step 116 and releases the reservation of the channel. In the same way, the PDA will send the next two short messages.

Figure 3:
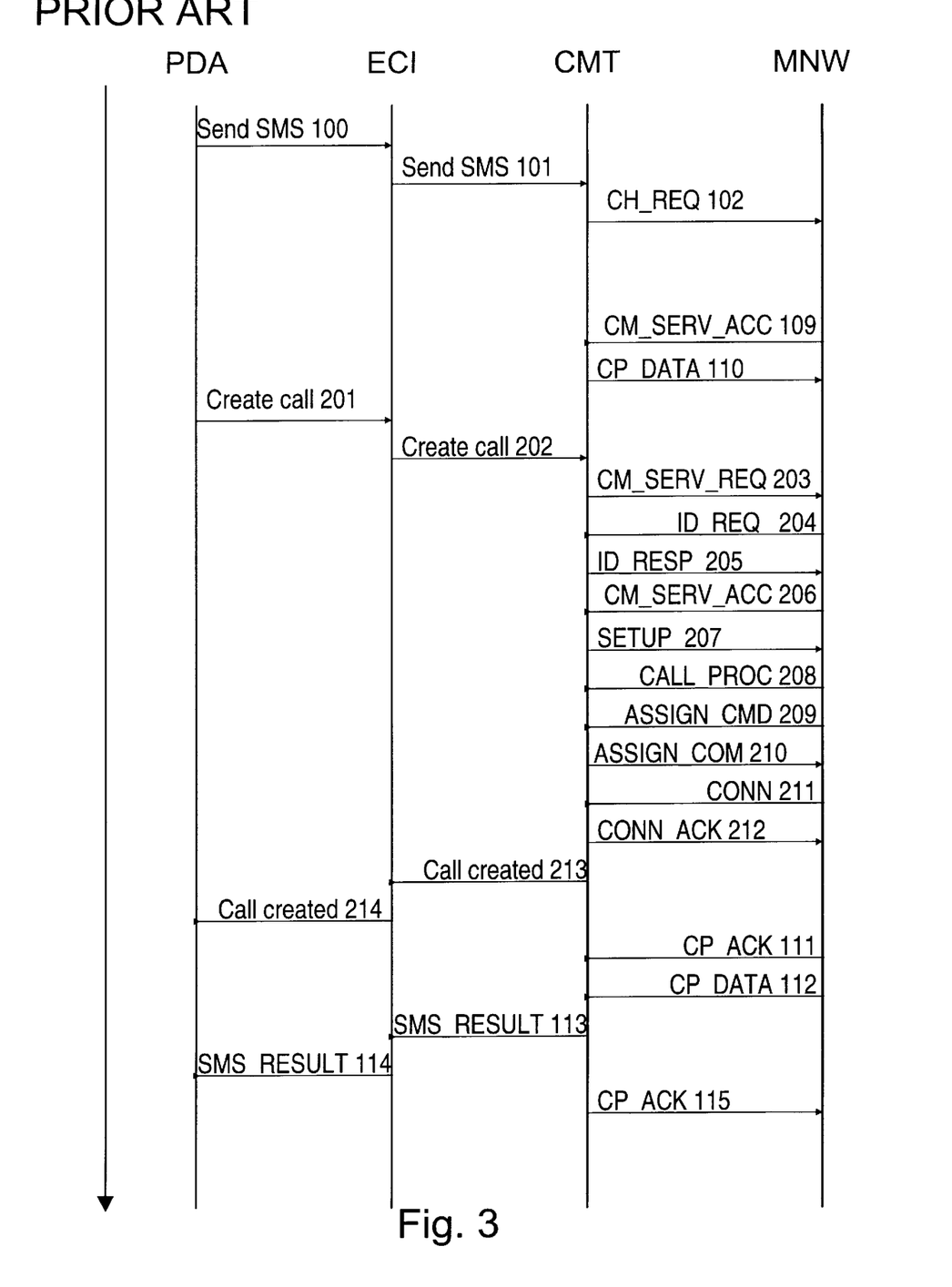
FIG. 3 shows in flow diagram form signalling between a GSM phone of prior art, and a network on a radio interface when in the middle of the transmission of a short message an attempt is made to initiate a call with the phone.

FIG. 3 shows signalling between a GSM phone and a GSM network when in the middle of the transmission of a short message an attempt is made to initiate a call with the phone. In step 100, the PDA transmits a short message to the ECI and, in steps 101–104, corresponding steps as presented in FIG. 2 will be repeated. After step 104, when the transfer of a short message has been initiated, a user indicates, e.g. via the PDA, that he would like to make a call, and the PDA sends, in step 201, a call request to the ECI which, in step 202, forwards the call request to the CMT. In this example, the ECI is arranged to receive call initiation requests for both the PDA's and the CMT's part and, therefore, it does not make any difference which one the user uses for initiating the call. In step 203, the CMT sends a message "CM_SERV_REQ" to the MNW after which the MNW can send a message 204 "ID_REQ" to the CMT to request the CMT's identification to which the CMT, in step 205, sends as a reply a message "ID_RESP" to the MNW. In step 206, the MNW accepts the call, the creation of the call continues and the MNW sends a message "CM_SERV_ACC" of the acceptance of the call to the CMT. The CMT defines the connection in step 207 and, in steps 208, 209 and 210, the CMT and the MNW initialise the call. In step 211, the MNW informs the CMT of the creation of the call and, in step 212, the CMT replies to the MNW with a message "CONN_ACK" and then informs the ECI of the creation of the call in step 213 after which the ECI informs the PDA of the creation of the call in step 214. After the creation of the call when the short message has been transferred to the MNW, the MNW sends the CMT a message of this in step 111 and 112 and the CMT informs the ECI of the result of the transfer of the short message (succeeded or did not succeed) in step 113 and, in step 114, the ECI sends the result to the PDA. In step 115, the CMT replies to the MNW with a message "CP_ACK" that it has received the result of the transfer of the short message, and the call will continue. However, some mobile networks do not operate in the manner described here but, instead, some of them reply to the message "CM_SERV_REQ", sent in step 203, with a message "CM_SERV_REJ". With this message, the network informs the CMT that the call initiation request has been rejected. The CMT will then stop trying to create the call. Some mobile networks simply ignore the message "CM_SERV_REQ", sent by the CMT for initiating a call, when the transmission of a short message is pending. In that case, the CMT waits for a message "CM_SERV_ACC" from the MNW and simultaneously continues the ongoing transmission of the short message. When the short message has been transmitted, the mobile network releases the radio channel and the CMT detects that the initiation of the call was unsuccessful.

Figure 4:
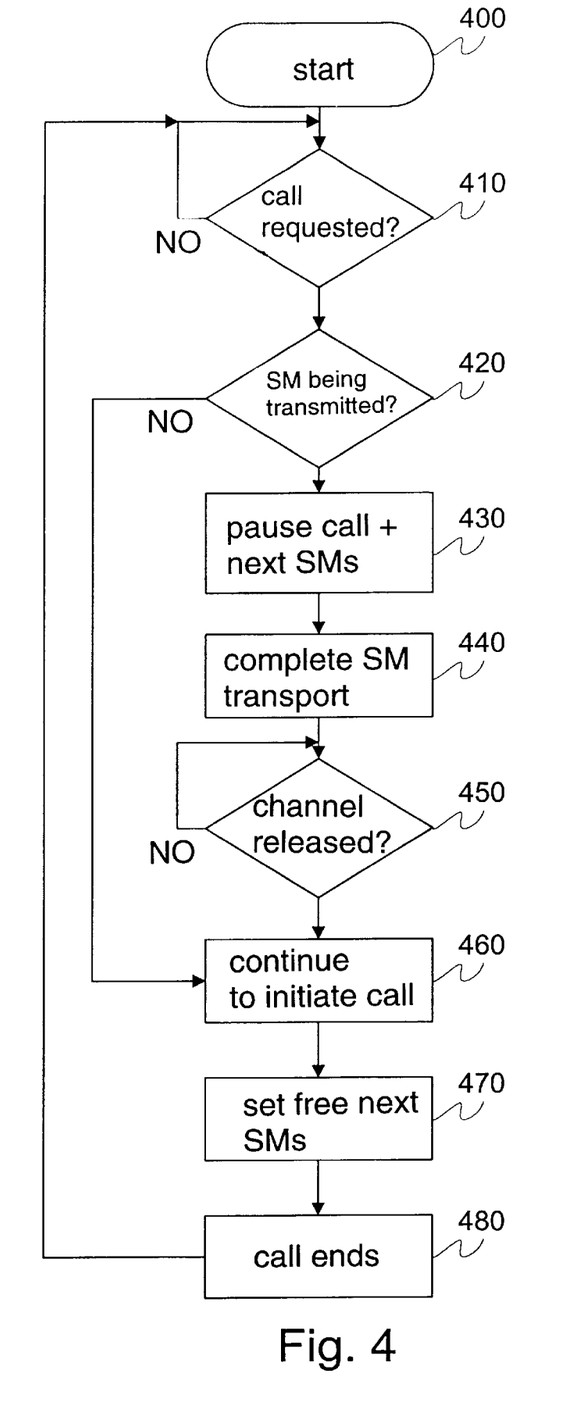
FIG. 4 shows in flow diagram form the operation of a GSM multiservice mobile station according to the invention when in the middle of the transmission of a short message an attempt is made to initiate a call with the phone.

The flow diagram in FIG. 4 shows the operation of a GSM multiservice mobile station according to the invention when in the middle of the transmission of a short message an attempt is made to initiate a call with the phone. In this example, the initiation of the call via the mobile station's CMT part is arranged to go around all the way through the ECI and therefore, the ECI will always be informed when a user is trying to initiate a call e.g. by pressing a call initiation key. By means of a mobile station according to the invention, a call can be initiated after the ongoing transmission of a short message has ended. All mobile networks do not support the initiation of a call in the middle of the transmission of short messages, but most of them support the transmission of short messages in the middle of an ongoing call.

The flow diagram begins from a block 400. In a block 410, it is checked whether a user has requested the initiation of a call e.g. with a switch B1. If not, the mobile station continues to carry out its other activities, such as signalling with the mobile network, transmitting or receiving short messages. Instead, if the user has requested the initiation of a call to some number, e.g. by using the switch B1, the mobile station will check, in a block 420, whether it is currently sending a short message. If it is not, the mobile station will try to make a call in a normal way but, if it is, in a block 430, the mobile station will pause the request made by the user for initiating a call to wait for the completion of the transfer of the short message. In addition, it will temporarily prevent the transmission of new short messages so that after the ongoing transmission of a short message has ended, it would not immediately continue by sending the next short message. In a block 440, the mobile station continues to carry out its other activities, in particular, the ongoing transmission of a short message until it has been transferred in full and requests the mobile network to close the channel used for transmitting the short message. After this, it will monitor the signals transmitted by the mobile network in a block 450 until the mobile network sends a message of the closing of the channel (step 116 in FIG. 2). Then, in a block 460, the mobile station begins to try to create a call and sends the mobile network a request (step 203 in FIG. 3) for initiating the call. After sending this request to the mobile network, the mobile station begins to send, in a block 470, the rest of the short messages if any remained untransferred for the duration of the initiation of the call due to the initiation of the call. The call will then be initiated. After the call has ended, the performance moves from a block 480 back to the block 410 where it will again be monitored whether the user has requested the initiation of a call to some number. Thus, the ending of a call does not presuppose the ending of the transmission of short messages and, vice versa, the transmission of short messages may end during a call.

Figure 5:
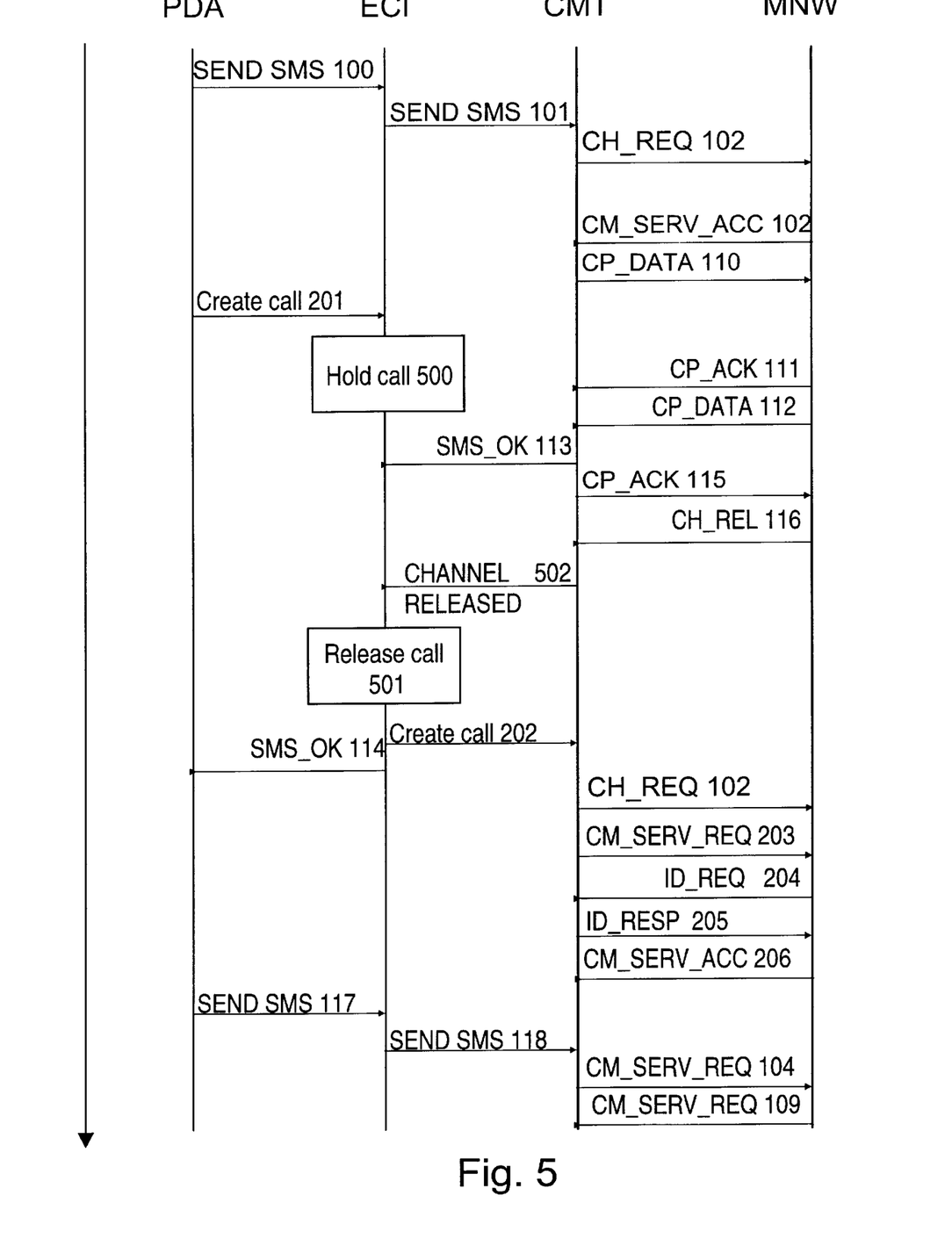
FIG. 5 shows in flow diagram form signalling of a GSM multiservice mobile station, according to the invention, with a GSM network when in the middle of the transmission of a short message an attempt is made to initiate a call with the phone.

The flow diagram in FIG. 5 shows the operation of a GSM phone, according to the invention, with a GSM network when in the middle of the transmission of a short message an attempt is made to initiate a call with the phone. The flow diagram is similar to the flow diagram in FIG. 3 all the way to step 201. However, in step 500, the ECI checks the ongoing transfer of a short message and when it detects that the transfer of the short message is pending, the ECI will not yet convey the request to the CMT but, instead, it will pause the call request and first carry out steps 111, 112, 113, and 115, after which, in step 116, the MNW releases the channel and communicates this to the CMT. After this, the CMT sends, in step 502, a message "CHANNEL RELEASED" to the ECI which only after receiving the message releases the call request and, in step 202, sends it to the CMT and then, in step 114, informs the PDA of the result of the transfer of the short message (successful, unsuccessful). In steplo2, the CMT requests the MNW to provide a channel for the call after which the CMT and MNW will communicate with one another in steps 203–205 until, in step 206, the MNW accepts the call to be initialised and informs the CMT of this. The PDA sends the next short message in step 117 to the ECI, which will send it to the CMT in step 118. In step 104, the CMT requests the MNW to provide a connection for transferring a short message and after this, in step 109, the MNW accepts the connection and the transfer of the short message begins. A device, according to the invention, differs from prior art as for steps 500, 501, and 502. Although here steps 500 and 501 are implemented in the ECI, they can alternatively be implemented in the CMT.

Naturally, the invention is also well suitable for use without the PDA part. As regards the invention, it is not important whether the request for transmitting a short message comes from the PDA part or the CMT of a mobile station or from some other part of the mobile station. Neither is it of importance as regards the invention whether the PDA and CMT parts are integrated in the same device or whether they are implemented as separate devices, which are connected to one another e.g. with a cable or infrared. The invention can also be used in a device, which cannot send several short messages at a time, whereupon the successful initiation of a call is secured by it by waiting for the ending of the transmission of a short message to be transmitted before attempting to make a call. As for the operation of a device according to the invention, capable of transmitting concatenated short messages, it is not important during the transmission of which short message the attempt to make a call is made. The user may e.g. try to make a call during a first or last short message of a package formed by several short messages or during any short message to be sent in between them, and the device according to the invention will wait for the completion of the transfer of a short message to be sent at any given time before it tries to initiate the call. In addition to making ordinary calls, the invention is suitable for making data and fax calls. In addition, an SS (Supplementary Service) inquiry, e.g. the checking of a call waiting function that has been switched on, can be made according to the invention. Furthermore, the invention is suitable for use in improving the probability of success of a call to be initiated during the transmission of an individual, unconcatenated short message, as well as during the transmission of the last short message of a short message chain. By delaying the implementation of a call command given in the middle of the transmission of an individual short message or the last short message of a short message chain till the ending of the short message, the above described errors preventing the initiation of a call can be avoided.

The invention can be applied with mobile networks capable of transferring all types of short messages, and it is always useful when the mobile network does not for some reason allow a call to be initiated during the transfer of a short message. Thus, the invention is not merely restricted to a GSM network although here we illustrated, using examples, its use with a GSM network.

This paper presents the implementation and embodiments of the present invention with the help of examples. A person skilled in the art will appreciate that the present invention is not restricted to details of the embodiments presented above, and that the invention can also be implemented in another form without deviating from the characteristics of the invention. The embodiments presented above should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

For example, after transmitting a short message a mobile station may, before initiating a call, wait for the fulfilment of a short pre-determined delay instead of a message arriving from a mobile network informing of the release of a channel or the mobile station may keep on-hold the short messages it paused due to the initiation of a call until the end of the call and only then transmit them to the mobile network.

What is claimed is:

1. A method for initiating a wireless call with a mobile station, comprising the steps in the mobile station of:
   receiving a call initiation command from a user;
   checking whether a transmission of a short message is going on and, if yes, further performing the following steps in the mobile station of:
   holding the initiation of the call and the transmission of new short messages;
   after the transmission of said short message has ended, holding the initiation of the call until a data transfer channel used for transferring the short message has been released, after which;

continuing the initiation of the call by sending a call initiation command to a mobile network; and ending said holding of the initiation of the transmission of short messages.

2. A method according to claim 1, comprising the step of monitoring signals sent to the mobile station by the mobile network for detecting the release of the data transfer channel used for the transfer of a short message.

3. A method according to claim 1, wherein release of the data transfer channel used for the transfer of a short message is estimated to have been carried out after a specific delay following the completion of said ongoing transmission of the short message.

4. A method according to claim 1, wherein the transmission of short messages that remained untransmitted due to the prevention of the transmission of short messages will be started after the transmission of the call initiation command by beginning the creation of the data transfer channel to be used for the transmission of short messages.

5. The method of claim 1 wherein the step of ending said holding of the initiation of the transmission of short messages further comprises the steps of a transmitting the new short message that remain untransmitted over the data transfer channel.

6. A mobile station comprising:

A radio transmitter-receiver and an antenna for transmitting a short message via a mobile network to a second user terminal, calling means for giving a call initiation command, holding means for holding the initiation of the transmission of short messages in response to the giving of said initiation signal, indication means for indicating the ongoing transmission of a short message and for indicating the ending of such transmission of a short message, a radio transmitter-receiver for transmitting a call initiation command in response to the indication of the ending of the transmission of a short message following said call initiation signal, and in response to the transmission of said call initiation command, said holding means are arranged to end said holding.

7. A mobile station according to claim 6, comprising:

a PDA part for inputting at least one piece of information by a user of the mobile station, a memory for receiving and storing said information, connecting means for transferring said information from said memory to said radio transmitter-receiver, and said radio transmitter-receiver is arranged to transmit said information in the form of a short message.

8. A mobile station according to claim 5, comprising a timer for waiting for a specific delay after the transmission of a short message has ended before sending said call initiation command.

9. A mobile station according to claim 5, wherein said prevention means are arranged to be ended by said holding after the mobile station has sent said call initiation command to the mobile network.

10. A mobile station according to claim 5, wherein said inspection means are arranged to detect said ending of the transmission of a short message due to the arrival of a signal from the mobile network informing of the release of the data transfer channel used for the transmission of the short message to be received by said radio transmitter-receiver.

11. A mobile station according to claim 5, wherein in response to the use of said calling means, said radio transmitter-receiver is arranged to transmit said call initiation command without waiting for the ending of the transmission of the short message.

12. A method for initiating a wireless call with a mobile station which is also capable of transmitting short messages, comprising the steps of:

initiating a call initiation command;

checking whether a transmission of a short message is going on and, when it is, holding the initiation of the call and the transmission of new short messages, and after the transmission of the short messages has ended;

holding the initiation of the call until a data transfer channel used for transferring the short message has been released, after which;

continuing the initiation of the call by sending a mobile network the call initiation command; and ending the holding of the initiation of the transmission of short messages; wherein the transmission of short messages that remained untransmitted due to the prevention of the transmission of short messages will be started after the transmission of the call initiation command.

13. A method according to claim 12, further comprising the step of monitoring signals sent to the mobile station by a mobile network for detecting the release of the data transfer channel used for the transfer of the short message.

14. A method according to claim 12, wherein the release of the data transfer channel used for the transfer of the short message is estimated to have been carried out after a specific delay following the completion of the ongoing transmission of the short message.

15. A mobile station comprising:

a radio transmitter-receiver and an antenna for transmitting a short message via a mobile network to a second user terminal;

a calling device for giving a call initiation command;

a holding unit for holding an initiation of the transmission of short messages in response to the call initiation signal;

an indication device for indicating an ongoing transmission of a short message and for indicating an ending of the transmission of a short message;

a radio transmitter-receiver for transmitting a call initiation command in response to the indication of the ending of the transmission of a short message following the call initiation command; wherein in response to the transmission of the call initiation command, the holding unit is adapted to end the holding;

a PDA part for inputting at least one piece of information by a user of the mobile station;

a memory for receiving and storing the information;

a connection for transferring the information from the memory to the radio transmitter-receiver, and wherein the radio transmitter-receiver is arranged to transmit the information in the form of a short message.

16. A mobile station according to claim 15, further comprising a timer for waiting for a specific delay after the transmission of a short message has ended before sending the initiation command.

17. A mobile station according to claim 15, wherein the holding of the initiation of short messages is to be ended by the holding unit after the mobile station has sent the call initiation command to the mobile network.

18. A mobile station according to claim 15, wherein an inspection device is adapted to detect an ending of the transmission of a short message due to an arrival of a signal from the mobile network informing of a release of a data transfer channel used for the transmission of the short message to be received by the radio transmitter-receiver.

* * * * *